US 6,526,789 B1

(12) United States Patent
Edgerly et al.

(10) Patent No.: US 6,526,789 B1
(45) Date of Patent: Mar. 4, 2003

(54) LOCKABLE ANTI-WOBBLE HITCH PIN

(75) Inventors: Jeffrey R. Edgerly, Bristol, CT (US); Neil McDaid, Dorchester, MA (US)

(73) Assignee: Industri AB Thule, Hillerstorp (SE)

( * ) Notice: Subject to any disclaimer, the term of this patent is extended or adjusted under 35 U.S.C. 154(b) by 95 days.

(21) Appl. No.: 09/658,365

(22) Filed: Sep. 8, 2000

Related U.S. Application Data

(63) Continuation-in-part of application No. 09/537,787, filed on Mar. 29, 2000, now abandoned.
(60) Provisional application No. 60/126,666, filed on Mar. 29, 1999.

(51) Int. Cl.[7] ............................................... F16B 41/00
(52) U.S. Cl. .................. 70/232; 70/DIG. 57; 224/521; 411/1; 411/353; 411/374; 411/384; 411/389; 411/397; 411/910
(58) Field of Search ........................ 70/229–232; 411/1, 411/910, 383, 384, 389, 396, 397, 374, 353, 999; 224/521

(56) References Cited

U.S. PATENT DOCUMENTS

| 209,181 | A | * | 10/1878 | Miller |  |
|---|---|---|---|---|---|
| 3,041,913 | A |  | 7/1962 | Liska | 411/87 |
| 3,222,744 | A |  | 12/1965 | Dellith | 411/337 X |
| 3,605,460 | A | * | 9/1971 | Singer et al. |  |
| 4,342,530 | A |  | 8/1982 | Baker et al. | 411/374 |
| 4,904,145 | A |  | 2/1990 | Koutsoupidis | 411/396 |
| 5,207,545 | A | * | 5/1993 | Kochanski | 411/383 |
| 5,244,133 | A | * | 9/1993 | Abbott et al. | 403/370 X |
| 5,415,510 | A | * | 5/1995 | Funaki et al. | 411/384 |
| 5,697,592 | A |  | 12/1997 | Matheny et al. | 411/535 X |
| 5,787,675 | A |  | 8/1998 | Futagi et al. | 52/745.1 |
| 6,309,158 | B1 |  | 10/2001 | Bellinghausen et al. | 411/353 |
| 6,328,514 | B1 | * | 12/2001 | Shoen | 411/374 |
| 6,390,344 | B1 | * | 5/2002 | Edgerly | 224/531 |

FOREIGN PATENT DOCUMENTS

| DE | 1083604 |  | 6/1960 |  |
| FR | 637180 |  | 4/1928 |  |
| GB | 501462 | * | 2/1939 | 411/374 |
| GB | 603268 |  | 6/1948 |  |
| GB | 1138790 | * | 1/1969 | 411/374 |
| GB | 2189563 A |  | 10/1987 |  |
| SU | 724814 |  | 3/1980 |  |

* cited by examiner

Primary Examiner—Lloyd A. Gall
(74) Attorney, Agent, or Firm—Howrey Simon Arnold & White LLP

(57) ABSTRACT

A hitch pin used for releasably connecting a load carrier frame to a receiving hitch attached to a carrying vehicle for transporting objects such as bicycles on the load carrier. The hitch pin includes a bolt having a head portion opposite a threaded section and a stem integrally formed between the head portion and the threaded section. A sleeve includes a bore, sized to receive the head and the stem of the bolt which is slidably held inside the bore of the sleeve using a transverse pin, secured inside the bore of the sleeve and passing through an elongate slot in the stem of the bolt. When the sleeve is rotated, the transverse pin transmits the rotation to the bolt providing the turning motion used during connecting of the frame to the receiving hitch. The connection may be made in two stages with hand-tightening as the first stage, followed by application of mechanical force, operating from a set screw, through the bolt to intensify the contact between the frame and the receiving hitch.

10 Claims, 4 Drawing Sheets

LOCKABLE ANTI-WOBBLE HITCH PIN

RELATED PATENT APPLICATIONS

This application is a continuation-in-part patent application of U.S. application Ser. No. 09/537,787 filed Mar. 29, 2000 now abandoned and entitled LOCKABLE ANTI-WOBBLE HITCH PIN, now abandoned, which claims priority to U.S. provisional application Ser. No. 60/126,666 filed Mar. 29, 1999 also entitled LOCKABLE ANTI-WOBBLE HITCH PIN. Said applications in their entireties are hereby expressly incorporated by reference into the present application.

DESCRIPTION

1. Technical Field

The present invention relates generally to devices used to attach portable frames to hitches on vehicles used to transport such frames, and more specifically to a locking hitch pin including a threaded rod and a sleeve, connected to the threaded rod, to produce a one-piece, lockable bolt or pin used for essentially wobble-free connection of a receiving hitch to a portable frame. A protective housing is also provided that fits about the hitch pin and includes a locking device to prevent detachment of the housing and removal of the hitch pin.

2. Background Art

The attachment of load carrier frames at rearward portions of transport vehicles is well known, and especially for use as sports equipment carriers for bicycles and the like. Modern bicycles are expensive pieces of sports equipment and security becomes an issue when such equipment must be left unattended on a load carrier. A visible means of locking the equipment to the frame and the frame to the vehicle provides a deterrent to unauthorized removal.

Another problem associated with such load carrier frames when attached to vehicles occurs when rough terrain is encountered during travel. Since most carrier frames have multiple interconnected parts, including the connection to a vehicle hitch, the opportunity exists for the introduction of play or wobble between such parts. Depending on the extent of play or wobble, the load carrier frame may permit or generate movement that causes the equipment supported on the carrier to collide with the frame, its support structure, or the rear of the vehicle, ultimately resulting in damage to one or more of the colliding articles.

For at least those reasons mentioned above, it has become important to minimize the play and wobble associated with such load carrier frames and secure the carrier and sports equipment against theft.

U.S. Pat. No. 5,244,133 provides a description of a wobble-free trailer hitch mounting. The mounting fits inside the receiving opening of a receiver type hitch. At least a portion of the mounting responds to the rotation of a threaded rod to enlarge the effective width of the mounting. When positioned inside the receiving hitch, as its effective width increases, the mounting exerts pressure on the inner walls of the receiving hitch and this limits play between the mounting and the receiving hitch for reducing wobble in the connection.

The mounting of the '133 patent comprises multiple parts and a relatively complex mechanism to increase the effective width of the mounting to exert wobble free gripping action against the receiving hitch. The disclosed structure also includes a padlock method to prevent unauthorized removal of the mounting from the hitch. This method is somewhat cumbersome and uses multiple separate pieces including a padlock and a hitch pin. Such a lockable hitch pin is well known and typically takes the form of a bolt that is passed through a receiving hitch and a mounting that is positioned inside the hitch. After passing through the hitch and emerging on the opposite side, a locking cap may be placed on the front end of the shaft and secured by a key. This lockable hitch pin, however, does not include an anti-wobble feature.

In view of the above described deficiencies associated with the designs and utilizations of known designs for supposed wobble-free, locking hitch mechanisms, the present invention has been developed to alleviate these drawbacks and provide further benefits to the user. These enhancements and benefits are described in greater detail hereinbelow with respect to several alternative embodiments of the present invention.

DISCLOSURE OF THE INVENTION

The present invention in its several disclosed embodiments alleviates the drawbacks described above with respect to conventionally designed anti-wobble mechanisms for hitch-mount load carriers that may be locked for security, and incorporates several additionally beneficial features. Features of particular interest include the provision of an anti-wobble device as part of the hitch pin itself and a lockable housing positioned over the hitch pin to provide environmental protection and prevent unauthorized entry.

The anti-wobble hitch pin has two primary parts, namely a threaded rod and a sleeve having a bore sized to matingly receive at least a portion of the threaded rod. A transverse pin lies across the bore with its ends held in contact with the wall of the sleeve. The transverse pin also passes through a longitudinal slot in the portion of the threaded rod received in the bore of the sleeve. In this position the transverse pin transmits any applied rotational force, from the sleeve to the rod causing these two parts to move together when rotated. At the same time, the longitudinal slot allows the rod to slide, to a limited extent, into and out of the bore of the sleeve. Such sliding motion is a controlled motion governed by a set screw engaging a threaded cup formed in the end of the rod lying inside the bore of the sleeve. A shoulder, protruding into the bore of the sleeve, separates this end of the rod from the head of the set screw. Application of turning motion to the set screw results in impingement of the screw head against one side of the shoulder and, with continued turning, the screw thread enters deeper into the threaded cup to draw the rod towards the other side of the shoulder and further into the bore of the sleeve.

A washer and a lock washer lie captive between the rod and the sleeve at the mouth of the sleeve. The secured combination of these several members provides a single unified article that replaces the multi-part units previously known and used for such securement purposes; that is, securement of a hitch-mount load carrier rack to a carrying vehicle.

The threaded end of the rod of this unified article passes through a hole in the side of the receiving hitch and a hole in a tubular mounting bar for the load carrier frame. After passing through a first side of the exterior tubular hitch portion and extending into the inserted tubular portion of the load carrier, the threaded end of the rod screwably engages a nut that is welded to the far inside surface of the inserted mounting bar of the carrier. Rotation of the sleeve and rod assembly draws the threaded rod into this nut until the washer impinges against the outer surface of the receiving hitch. Continued rotation of the rod then causes the outer surface of the inserted mounting bar to engage the opposed inner surface of the surrounding receiving hitch. Up to this point, the turning of the unified article has been preferably accomplished manually by an operator. As contact between the mounting bar surface and the inside of the receiving hitch increases, however, the unified article resists further hand tightening. At this stage, an allen wrench may be utilized to engage and further turn the set screw located in the sleeve thereby drawing the rod, over the transverse pin, further into the bore of the sleeve. This increases the gripping pressure exerted between the abutting portions of the mounting bar surface and the inside surface of the receiving hitch for the purpose of minimizing play between those components. A partial turn is generally sufficient to eliminate any remaining wobble associated with attachment of the carrier's mounting bar to the receiving hitch of the transporting vehicle.

In at least one embodiment, the present invention takes the form of an anti-wobble hitch pin that includes a bolt having a head portion opposite a threaded section and a stem integrally formed between the head portion and the threaded section. The stem includes an elongate slot and the head portion has a threaded channel formed therein having a longitudinal axis in common with that of the bolt. A sleeve is provided that is sized to receive the head and the stem. The sleeve has a wall that includes an outer surface and an inner surface that defines an internal bore. The sleeve also has a groove formed in a wall opening to the inner surface and a ledge extending into the internal bore from the inner surface. The ledge has an inside face and an outside face and the head of the bolt is positioned adjacent to the inside face. A set screw is utilized that has a flat head and a threaded shaft. The threaded shaft is located inside the internal bore co-axial with the sleeve and is engaged in a threaded channel in the head of the threaded bolt. The flat head of the set screw is limited in movement by its abutment with the outer face of the ledge. A retaining ring is located in a groove of the sleeve and the flat head of the set screw is confined between the retaining ring and the outer face of the ledge. A transverse pin is held within the internal bore of the sleeve by attachment to the wall of the sleeve such that the transverse pin passes through the elongate slot of the stem to transmit rotational force from the sleeve to the bolt.

The beneficial effects described above apply generally to the exemplary devices and mechanisms disclosed herein of the anti-wobble hitch pin with its protective, lockable housing. The specific structures through which these benefits are delivered will be described in detail hereinbelow.

BRIEF DESCRIPTION OF THE DRAWINGS

The invention will now be described in greater detail in the following way of example only and with reference to the attached drawings, in which.

MODE(S) FOR CARRYING OUT THE INVENTION

As required, detailed embodiments of the present invention are disclosed herein; however, it is to be understood that the disclosed embodiments are merely exemplary of the invention that may be embodied in various and alternative forms. The figures are not necessarily to scale, some features may be exaggerated or minimized to show details of particular components. Therefore, specific structural and functional details disclosed herein are not to be interpreted as limiting, but merely as a basis for the claims and as a representative basis for teaching one skilled in the art to variously employ the present invention.

Figure 1:
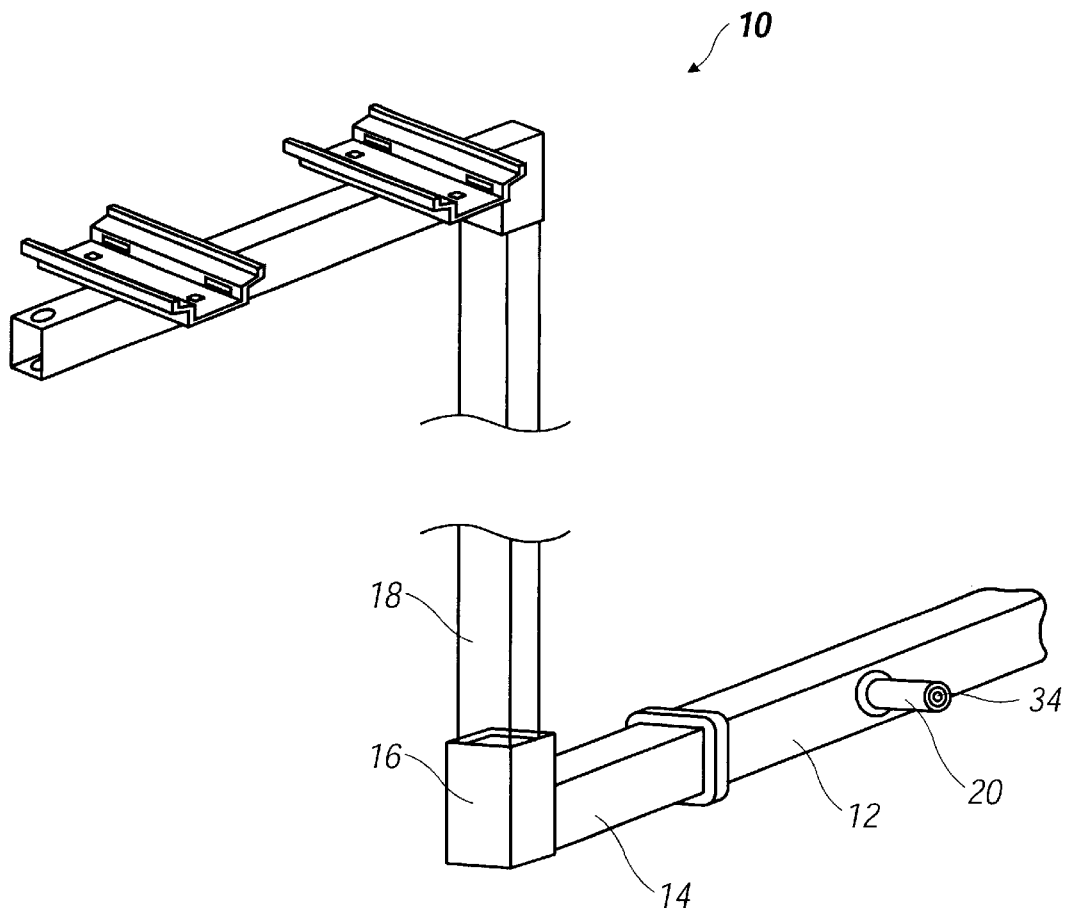
FIG. 1 is a perspective view of a support frame connected to a receiving hitch using the anti-wobble hitch pin of the invention.
Figure 2:
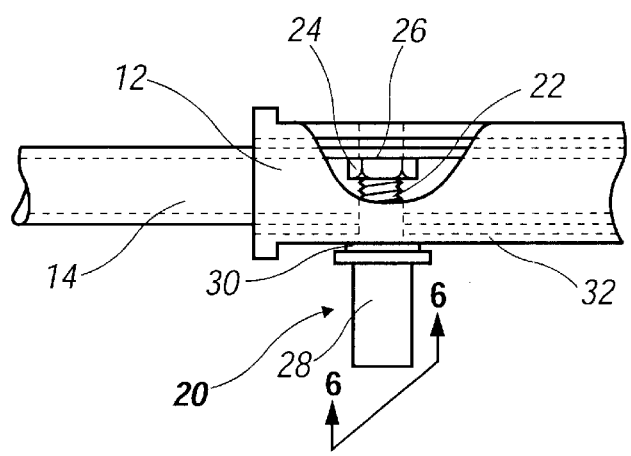
FIG. 2 is a plan view including a cut-away section showing detail of the connection of a support bar and an anti-wobble hitch pin of the invention used to hold the support bar in the receiving opening of a receiving type hitch.
Figure 6A:
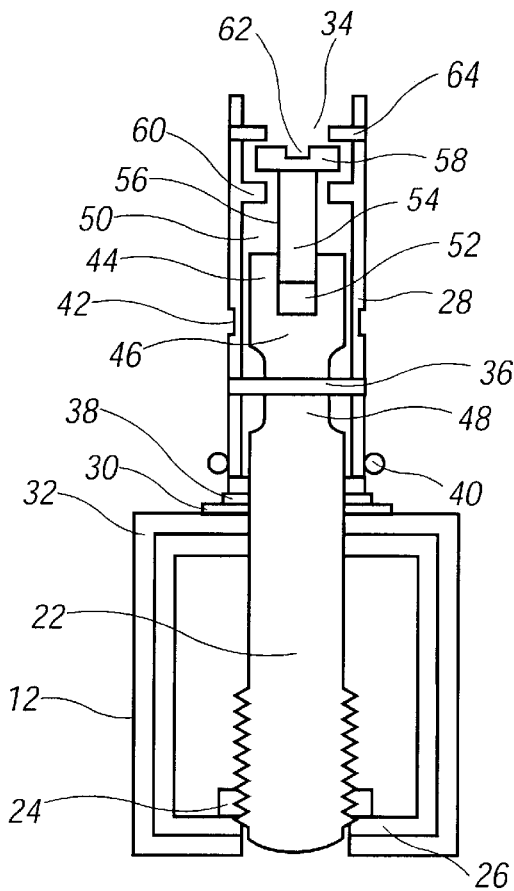
FIGS. 6A–6C provide a cross sectional view taken through line 6—6 of FIG. 2.
Figure 6B:
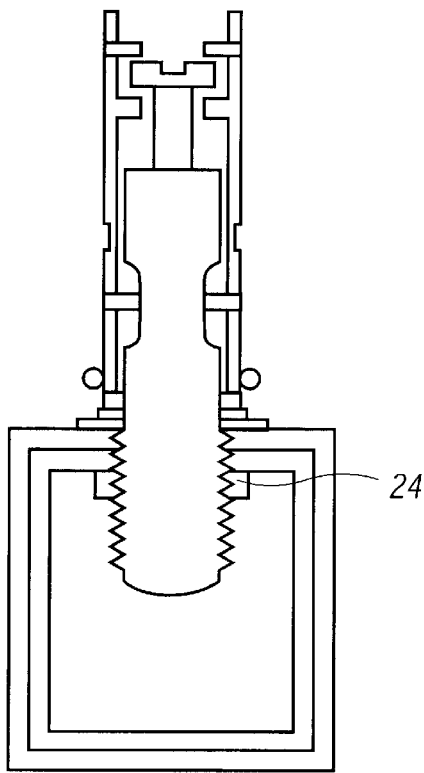
Figure 6C:
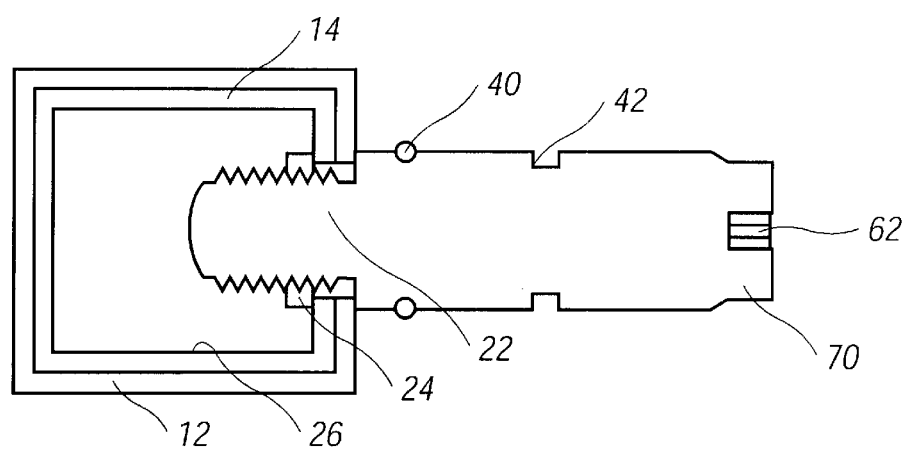

Referring to the Figures and using like reference numerals to identify like parts throughout the several views, FIG. 1 shows a load carrier frame structure 10 of the type used to support equipment, often sports equipment, such as bicycles, during transportation. As shown in FIG. 1, the frame 10 may be used to carry one or more bicycles. For bicycle transportation, the frame 10 may be attached to a suitable hitch receiver typically mounted at the rear of a transporting vehicle (not shown). FIG. 1 discloses a receiving hitch 12 with a support bar 14 inserted in an open end of the receiving hitch 12. The support bar 14 has an attached rectangular socket 16 in suitable orientation for insertion of the vertical tube 18 of the frame 10. Secure connection between the support bar 14 and the receiving hitch 12 relies upon an anti-wobble hitch pin 20, constructed according to the present invention, that is inserted and locked across the receiving hitch 12 and support bar 14. Details of the connection are disclosed in FIG. 2 showing a partial cutaway view in which the threaded bolt 22 of the anti-wobble hitch pin 20 passes through holes in the receiving hitch 12 and the support bar 14 to engage a threaded nut 24 held firmly against the wall 26 of the support bar 14. As illustrated in FIG. 2, the threaded nut 24 is secured to the inside wall 26 of the support bar 14 farthest from the entry point of the threaded bolt 22. With this arrangement, it is necessary for the threaded bolt 22 to traverse the width of the support bar 14 before engaging the threaded nut 24. A different embodiment, indicated in FIG. 6B places the threaded nut 24 on the inside wall 26 of the support bar 14 closest to the entry point of the threaded bolt 22. The difference in the relative positioning of the threaded nut 24 is that in the condition shown in FIG. 2 the threaded nut 24 is under tension that could, after prolonged use, cause the nut 24 to fracture from the inside wall 26 due to e.g. metal fatigue. Alternatively, with the threaded nut 24 on the inside wall 26 closest to the entry point of the threaded bolt 22 , tightening of the anti-wobble hitch pin 20 places the threaded nut 22 under compression in a preferred condition that is less subject to failure.

Insertion and initial manual rotation of the anti-wobble hitch pin 20 causes the threaded bolt 22 to engage the threaded nut 24 and to be drawn into the support bar 14. Hand tightening of the anti-wobble hitch pin 20 is sufficient to rotate and advance the threaded bolt 22. A washer 30, preceding the sleeve 28, limits advancement of the threaded bolt into the support bar 14 when sufficient rotation of the sleeve produces contact by the washer 30 against the side of the receiving hitch 12. With the washer 30 in this position, further hand rotation of the sleeve 28 draws the support bar 14 into abutting contact with the inside of the hitch wall 32 of the receiving hitch 12. Eventually, the sleeve 28 of the anti-wobble hitch pin 20 resists further hand rotation due to the binding pressure existing between the hitch wall 32 and the support bar 14. At this point, any residual play in the connection may be reduced to a minimum by applying additional force, aided by, as an example an allen-style or hex-key 86 formed from an extension of hexagonal cross-section bar or the like. The key is inserted into a receiver or opening 34 (see FIG. 3) to engage a set screw which, upon rotation, pulls the threaded bolt 22 further into the sleeve 28.

The various views of FIG. 3 through FIG. 6 exemplify a preferred embodiment of the structure of the anti-wobble hitch pin 20 of the present invention and provide basis for further explanation concerning the use of the anti-wobble hitch pin 20, by way of its unique design, to connect and remove any residual play between the support bar 14 and the receiving hitch 12.

Figure 3:
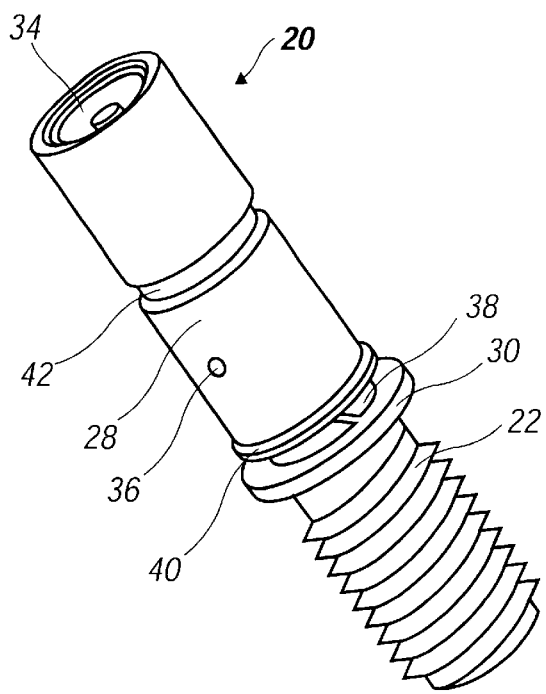
FIG. 3 provides a perspective view showing the exterior of the anti-wobble hitch pin of the invention.

FIG. 3 provides a perspective view, showing the exterior of an anti-wobble hitch pin 20, according to the present invention. The hitch pin 20, of this view, includes the threaded bolt 22 inserted in the sleeve 28 being slidably restricted therein by a transverse pin 36 in frictional contact with the wall of the sleeve 28. The washer 30 and a lock washer 38 lie captive between the bolt 22 and the sleeve 28, prevented from slipping from the anti-wobble hitch pin 20 by the relative sizing of the holes through the washers 30,38 and the extension of the thread from the side of the threaded bolt 22. An O-ring 40 attached to the sleeve 28 and an external groove 42 formed in the sleeve 28 accommodate optional items of a protective housing and security lock, respectively.

Figure 4:
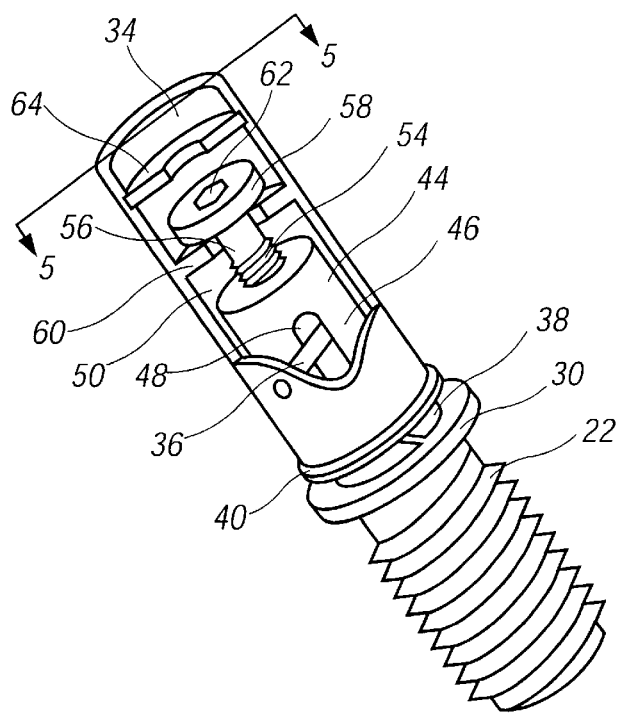
FIG. 4 shows a perspective view similar to FIG. 3 including a cut-away section with detail or internal components of an anti-wobble hitch pin of the invention.
Figure 5:
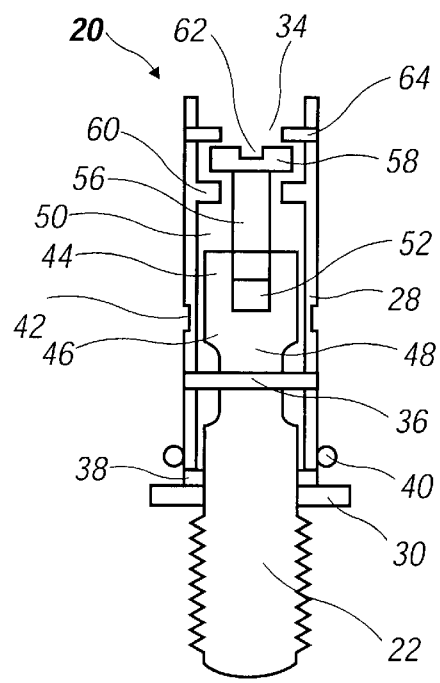
FIG. 5 is a cross sectional view of an anti-wobble hitch pin of the invention viewed from line 5—5 of FIG. 4.

FIG. 4 differs from FIG. 3 by showing, via a cutaway section, internal detail of the mechanism responsible for intensifying the gripping relationship between the support bar 14 and the receiving hitch 12, once the anti-wobble hitch pin 20 has been maximally hand tightened. Description of this mechanism requires recitation of other parts of the threaded bolt 22. An unthreaded extension of the bolt 22 includes a head portion 44 and a stem 46 integrally formed between the head portion 44 and the threads of the threaded bolt 22. An elongate slot 48 is provided through the stem 46 of the threaded bolt 22 that accommodates passage of the transverse pin 36 and slidably restricts the threaded bolt 22 within the bore 50 of the sleeve 28. The head portion 44 of the threaded bolt 22 includes a threaded cup 52 (see FIG. 5 and FIG. 6) for receiving the threaded shaft 54 of a set screw 56 which has a flat head 58. A ledge 60, positioned between the flat head 58 of the set screw 56 and the head portion 44 of the threaded bolt 22, limits the movement of these two parts towards each other when the set screw 56 is turned. During turning, when the set screw 56 abuts the upper face of the ledge 60, the screw's 56 advancement towards the head portion 44 ceases and continued turning of the set screw 56 pulls the threaded bolt 22 towards the inner face of the ledge 60 thereby drawing the bolt 22 further into the sleeve 28. Movement of the threaded bolt 22 into the sleeve continues as long as the elongate slot 48 is free to move past the transverse pin 36. This pin 36 holds the threaded bolt 22 inside the bore 50 of the sleeve 28 and transmits rotational force to the threaded bolt 22 from the sleeve 28 to which the pin 36 is secured. Thus, while the threaded bolt 22 has limited movement in and out of the sleeve 28, any turning motion, applied to the sleeve 28 of the anti-wobble hitch pin 20 of the invention, causes the transverse pin 36 to almost immediately contact the sidewalls of the elongate slot 48 with resulting rotation of the threaded bolt 22. Thus the combination of the sleeve 28 and the threaded bolt 22, held together by the transverse pin 36, provides a unified article with co-rotation of the parts 22,28 yet with limited linear movement between them. Both of these features, when built into a single article as disclosed herein, provide the unique capabilities of the anti-wobble hitch pin 20 to connect a support bar 14 to a receiving hitch 12. Tightening of this connection provides a play-free, anti-wobble condition by turning the set screw 56 while the sleeve 28 is braced against the washer 40 which abuts the side of the receiving hitch 12.

The flat head 58 of the set screw 56 has a contoured depression 62 suitable to receive and engage an allen key 86 that is preferably used to apply the required, increased turning force to the set screw 56 thereby transmitting the linear movement of the threaded bolt 22 to the threaded nut 24 to finally tighten the support bar 14 against the hitch wall 32. Thus, in the process of attaching the support bar 14 to the receiving hitch 12, the final step of set screw adjustment of the threaded bolt 22 introduces intense gripping contact at the hitch wall 32. Such contact could be difficult to release when it is necessary to remove the frame 10 from the receiving hitch after use.

The first step in the removal process is the reduction of tension between the threaded shaft 54 and the threaded cup 52 by reverse turning the set screw 56. This action withdraws the threaded shaft 54 from the threaded cup 52 until the flat head 58 abuts the retaining ring 64. When the set screw 56 abuts the retaining ring 64, which ring 64 is received in a groove of the sleeve continued reverse turning acts to move the threaded bolt 22 forward out of the bore 50 of the sleeve 28 to reduce the gripping contact at the hitch wall 32. With reduction in the contact force, the anti-wobble hitch pin 20 responds to removal by hand, after which the support bar 14 and the receiving hitch 12 may be separated release the frame 10 from the transporting vehicle.

Figure 7:
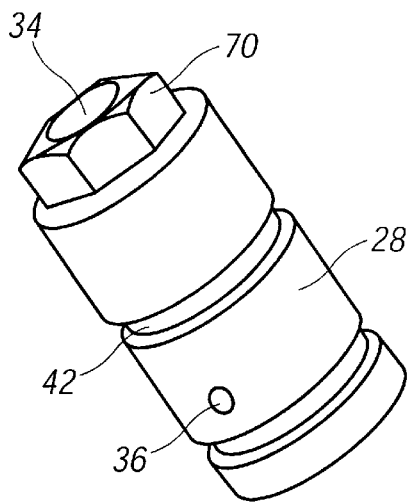
FIG. 7 is a perspective view of a sleeve of the invention including a hexagonal collar.

Due to a slight possibility of binding of the anti-wobble mechanism resulting in a resistance to release, an alternative method for removing the anti-wobble hitch pin 20 of the invention may use a hexagonal collar 70 molded into the body of the sleeve as shown in FIG. 7. In emergencies, the use of a wrench, applied to the hexagonal collar, will turn the sleeve and transmit the turning force through the transverse pin 36 to the threaded bolt 22 to unscrew it from the threaded nut 24.

An effective way to guard against binding and locking of the anti-wobble mechanism involves providing protection against intrusion by environmental contaminants that could corrode the moving parts of the anti-wobble hitch pin 20. With steel as the preferred material for the anti-wobble hitch pin 20, any exposure to moisture and oxygen presents the danger of rusting. This danger may be compounded by the normal position of the receiving hitch 12, and hence the anti-wobble hitch pin 20 when in use at a low point behind the towing vehicle. This position on the vehicle tends to receive a high degree of spray and dirt from wet roads over the frame 10 and associated fittings.

Figure 8:
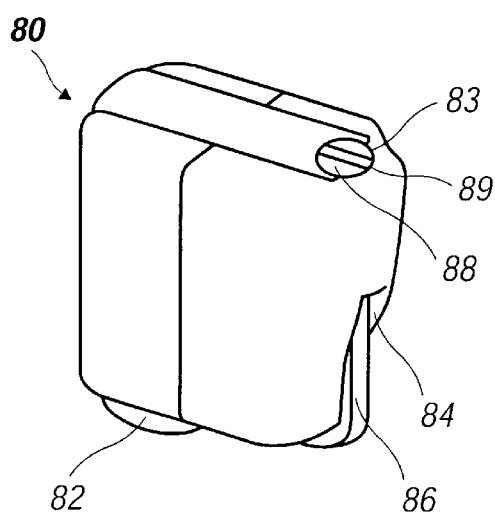
FIG. 8 shows a perspective view of a protective cover.
Figure 9:
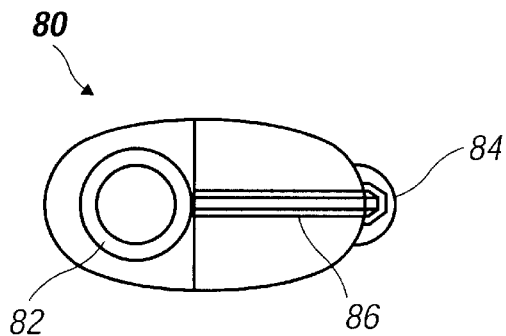
FIG. 9 provides a plan view of the underside of the protective cover.

FIG. 8 and FIG. 9 show a plastic or otherwise constructed protective housing 80 designed to fit over the sleeve 28 to prevent access, fouling and corrosion subsequent to installation of the anti-wobble hitch pin 20. A seat 82 in the base of the housing 80 engages the O-ring 40 to provide a water-tight seal around the sleeve 28. With the protective housing 80 in place over the sleeve 28, a barrel type security lock 88 may be inserted and thereafter located in the hole 83 in the top of the housing 80. In an exemplary embodiment, a portion of the lock 88, such as a tab extension, is rotatable into and out of inserted engagement with the groove 42 on the outside of the sleeve 28 for locking and releasing the housing 80 upon the sleeve 28. The barrel lock 88 is of a single-key design so that access to the anti-wobble hitch pin 20 is controllable through the utilization of a single key of conventional design. While the key is not shown in the Figures, a receiving key slot 89 is disclosed in FIG. 8. By this design which utilizes a single key of conventional design for tamper-resistant purposes, not only is the operation and securement of the anti-wobble hitch pin 20 simplified, but it also makes it possible to commonly key several different components of a particular load carrier arrangement, and possibly even to commonly key the anti-wobble hitch pin 20 with other lockable articles under the operator's control.

A further benefit associated with the protective housing 80 is the retaining notch or recess 84 formed on the outer surface of the housing 80 as a releasable storage receiver for the alien key 86 which is sized to fit the contoured depression 62 in the flat head 58 of the set screw 56, and which is used to remove the final traces of wobble between the support bar 14 and the receiving hitch 12.

A lockable anti-wobble hitch pin and its components have been described herein. These and other variations, which will be appreciated by those skilled in the art are considered to be within the intended scope of this invention as claimed below. As previously stated, detailed embodiments of the present invention are disclosed herein; however, it is to be understood that the disclosed embodiments are merely exemplary of the invention that may be embodied in various forms.

What is claimed and desired to be secured Letters Patent is as follows:

1. A hitch pin for releasably connecting a frame to a receiving hitch attached to a vehicle, said hitch pin comprising:
   a bolt having a head portion opposite a threaded section;
   a sleeve having an internal bore sized to receive said head portion for sliding engagement and co-rotation of said sleeve and said bolt;
   a set screw, engageable with said head portion, for repositioning said bolt relative to said sleeve; and
   said bolt including a stem integrally formed between said head portion and said threaded section, said stem including an elongate slot.

2. A hitch pin as recited in claim 1 further comprising a transverse pin held within said internal bore of said sleeve, said transverse pin passing through said elongate slot of said stem to transmit rotational force from said sleeve to said bolt.

3. A hitch pin as recited in claim 1 said bolt further including a threaded channel formed in said head portion of said bolt.

4. A hitch pin as recited in claim 1 said sleeve including a wall having an outer surface and an inner surface defining said internal bore, said sleeve further having a groove formed in said wall opening to said inner surface and a ledge extending into said internal bore from said inner surface, said ledge having an inside face and an outside face, said head of said bolt positioned adjacent said inside face.

5. A hitch pin as recited in claim 4 said set screw having a threaded shaft connected to a flat head, said threaded shaft located inside said internal bore, co-axial with said sleeve, said threaded shaft engaging a threaded channel in said head of said bolt, said flat head of said set screw limited in movement by abutting said outside face of said ledge.

6. A hitch pin as recited in claim 4 wherein said groove is adapted to receive a retaining ring to limit movement of a flat head of said set screw between said retaining ring and said outside face of said ledge.

7. A lockable assembly for releasably connecting a frame to a receiving hitch attached to a vehicle, said lockable assembly comprising:
   a hitch pin including a bolt having a head portion opposite a threaded section, a sleeve having an internal bore adapted to receive said head portion for sliding engagement and co-rotation of said sleeve and said bolt, and a set screw, engageable with said head portion, for repositioning said bolt relative to said sleeve;
   a protective housing adapted to receive said sleeve to prevent access to said hitch pin when a frame is releasably attached to a receiving hitch;
   wherein said sleeve has an outer surface with an external groove formed therein, said protective housing adapted to releasably engage said external groove with said sleeve received in said protective housing to prevent access to said hitch;
   said protective housing including a security lock having a tab for releasable engagement of said protective housing with said external groove of said sleeve;
   said protective housing having a hole formed therein to receive said security lock; and
   wherein said security lock is a locking cylinder sized for engagement in said hole formed in said protective housing.

8. A locking assembly as recited in claim 7 wherein said locking cylinder includes a locking mechanism activatable to move said tab for releasable engagement of said protective housing with said external groove of said sleeve.

9. A locking assembly as recited in claim 8 wherein activation of said locking mechanism requires a locking key.

10. A hitch pin used for releasably connecting a frame to a receiving hitch attached to a vehicle for transporting objects supported on said frame, said hitch pin comprising:
   a bolt having a head portion opposite a threaded section and a stem integrally formed between said head portion and said threaded section, said stem including an elongate slot, said head portion having a threaded cup formed therein having a longitudinal axis in common with that of said bolt;
   a sleeve sized to receive said head and said stem, said sleeve having a wall including an outer surface and an inner surface defining an internal bore, said sleeve further having a groove formed in said wall opening to said inner surface and a ledge extending into said internal bore from said inner surface, said ledge having an inside face and an outside face, said head of said bolt positioned adjacent said inside face;
   a set screw having a threaded shaft connected to a flat head, said threaded shaft located inside said internal bore co-axial with said sleeve, said threaded shaft engaging said threaded cup in said head of said bolt, said flat head of said set screw limited in movement by abutting said outside face of said ledge;
   a retaining ring in said groove of said sleeve, said flat head of said set screw confined between said retaining ring and said outside face of said ledge; and
   a transverse pin held within said internal bore of said sleeve by attachment to said wall of said sleeve, said transverse pin passing through said elongate slot of said stem to transmit rotational force from said sleeve to said bolt.

\* \* \* \* \*